(12) United States Patent
Li et al.

(10) Patent No.: US 7,469,251 B2
(45) Date of Patent: Dec. 23, 2008

(54) EXTRACTION OF INFORMATION FROM DOCUMENTS

(75) Inventors: Hang Li, Beijing (CN); Ruihua Song, Beijing (CN); Yunbo Cao, Beijing (CN); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/192,687

(22) Filed: Jul. 29, 2005

(65) Prior Publication Data

US 2006/0277173 A1 Dec. 7, 2006

Related U.S. Application Data

(60) Provisional application No. 60/688,766, filed on Jun. 7, 2005.

(51) Int. Cl.
*G06F 17/30* (2006.01)
(52) U.S. Cl. .......................................... 707/100; 707/5
(58) Field of Classification Search ................ 707/2–6, 707/100; 715/500, 200
See application file for complete search history.

(56) References Cited

U.S. PATENT DOCUMENTS 6,189,002 B1 * 2/2001 Roitblat .......................... 707/1
6,651,057 B1 * 11/2003 Jin et al. ........................ 707/5
7,062,485 B1 * 6/2006 Jin et al. ........................ 707/3
2006/0224605 A1 * 10/2006 Marcy et al. ................ 707/100

OTHER PUBLICATIONS

Y. Li, H. Zaragoza, R. Herbrich, J. Shawe-Taylor, & J. Kandola. The Perceptron Algorithm with Uneven Margin. In Proceedings of the Nineteenth International Conference on Machine Learning, pp. 379-386, 2002.
S. Robertson, H. Zaragoza, and M. Taylor, Simple BM25 Extension to Multiple Weighted Fields, In Proceedings of ACM Thirteenth Conference on Information and Knowledge Management, CIKM 2004.

* cited by examiner

*Primary Examiner*—Cheryl Lewis
(74) *Attorney, Agent, or Firm*—Westman, Champlin & Kelly, P.A.

(57) ABSTRACT

An information extraction model is trained on format features identified within labeled training documents. Information from a document is extracted by assigning labels to units based on format features of the units within the document. A begin label and end label are identified and the information is extracted between the begin label and the end label. The extracted information can be used in various document processing tasks such as ranking.

19 Claims, 4 Drawing Sheets

EXTRACTION OF INFORMATION FROM DOCUMENTS

CROSS REFERENCE TO RELATED APPLICATIONS

The present application is based on and claims the benefit of U.S. provisional patent application Ser. No. 60/688,766, filed Jun. 7, 2005, the content of which is hereby incorporated by reference in its entirety.

BACKGROUND

The discussion below is merely provided for general background information and is not intended to be used as an aid in determining the scope of the claimed subject matter.

A large amount of electronic documents are prevalent today throughout organizations and on the internet. These documents contain useful informational elements for a number of different purposes. In addition to explicit text within the documents, the documents include metadata that is indicative of a particular information retrieval element in a document. There are many different types of metadata for a document including title, author, date of creation, etc. Metadata in documents is useful for many kinds of document processing applications including search, browsing and filtering. Metadata can be defined by an author of the document to be used in these processing applications. However, authors seldom define document metadata completely and effectively.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

An information extraction model is trained on format features within labeled training documents as examples of correct information extraction. Information from a document is extracted by assigning labels to units based on format features of the units within the document using the trained information extraction model. Information extracted from the document can be used in different processing tasks, for example ranking in document retrieval.

DETAILED DESCRIPTION

The subject matter discussed below relates generally to processing electronic documents. In one aspect, features are identified from a set of training documents to aid in extracting information from documents to be processed. The features relate to formatting information and linguistic information in the document. One or more models are developed to express these features. During information extraction, documents are processed and analyzed based on at least one of the models and information is extracted based on the models.

Figure 1:
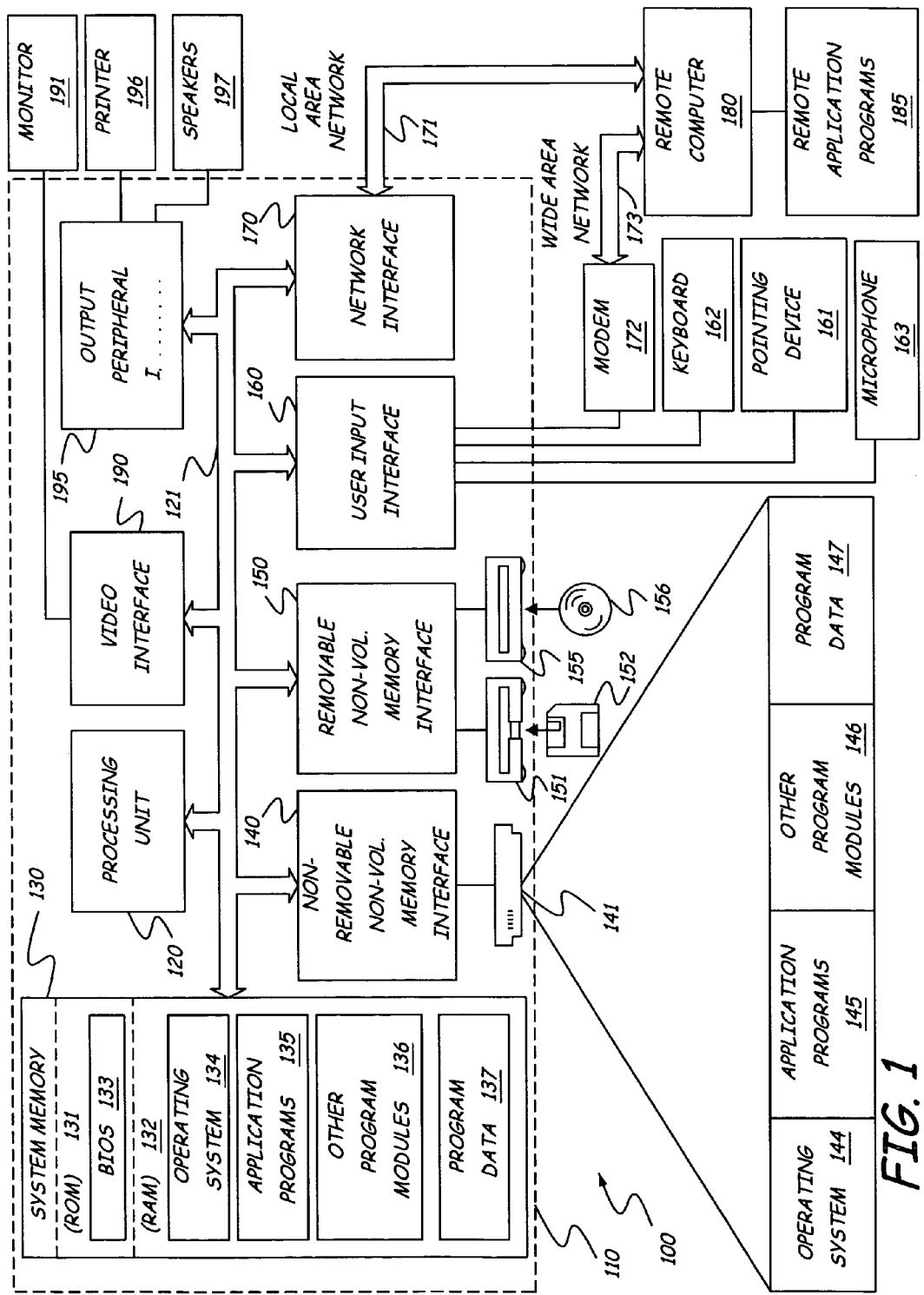
FIG. 1 is a block diagram of a computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
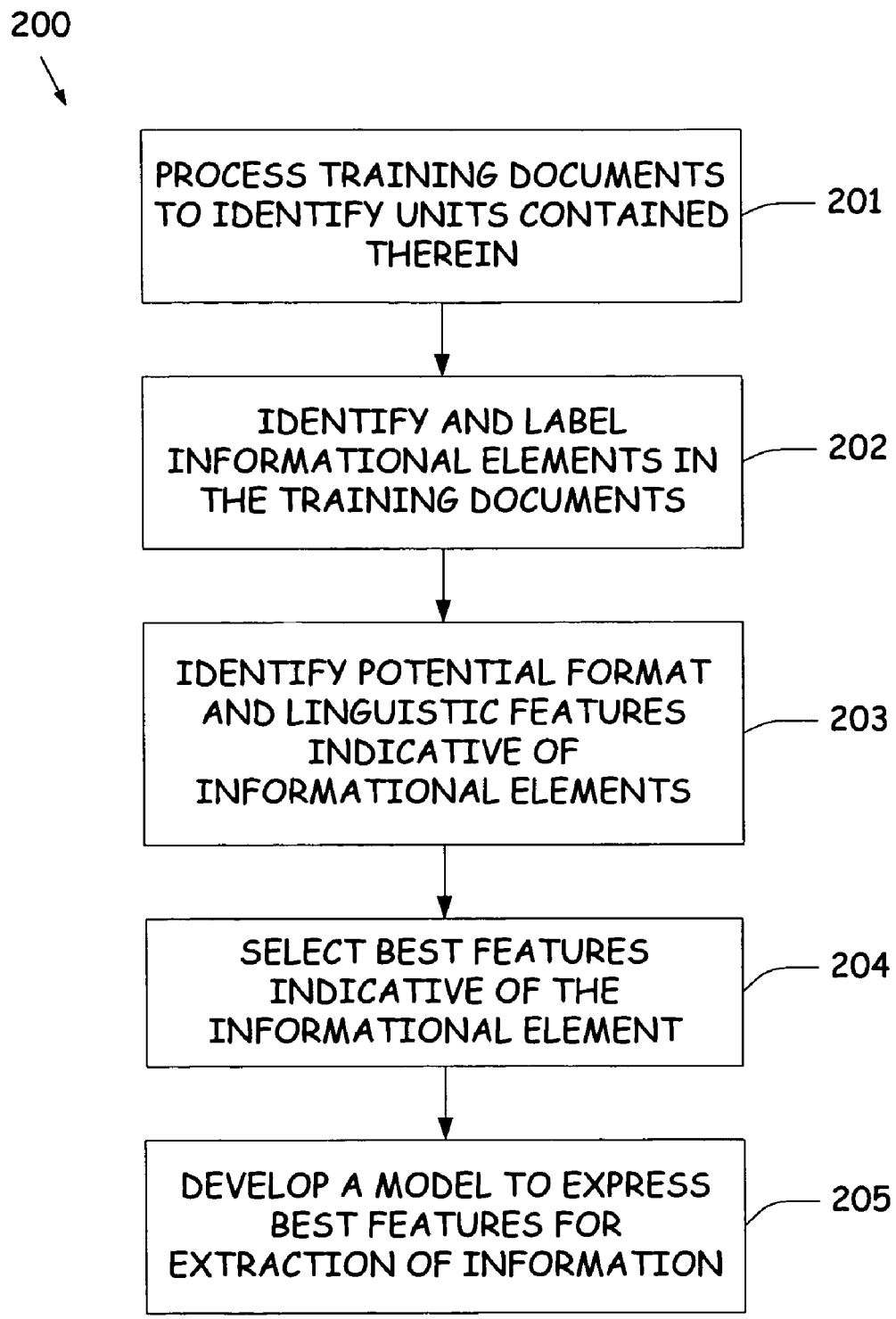
FIG. 2 is a flow chart of an exemplary method for selecting features for information extraction.

FIG. 2 is an exemplary method for developing models used to extract information from documents. Informational elements are annotated from a set of training documents. Features indicative of the informational elements can be selected based on formatting and linguistic information. For example, the features can be based on position, appearance, content and neighboring portions.

Method 200 begins at step 201 wherein training documents are processed to identify units contained therein. During processing, a number of units are extracted from the documents. The documents can be of any format, including Microsoft Word® document format, Microsoft PowerPoint® format, portable document format (PDF) and hypertext markup language (HTML) format, for example. One approach to identifying units involves separating the document into lines, which are separated by "return" symbols. If a line only has a single format, then the line will become a unit. If a line has several parts and each part has its own format, then each part will become a unit. Each unit is treated as an instance in training an extraction model. A unit can contain content information (for example linguistic information) and formatting information. After step 201, the document includes a sequence of units (instances).

At step 202, informational elements to be extracted are identified and labeled in the training documents. For example, a title, an author, a date of creation, etc. can be labeled. Once the informational elements are labeled, potential features indicative of the informational elements are identified at step 203. Instances of the informational elements within the labeled training documents are used as examples to select features. In one embodiment, the features are expressed as binary functions, i.e. a feature in the document is either true or not true. The features can be format features and linguistic features, for example. Format features can relate to font size, position and neighboring units while linguistic features can be based on the content of the informational element. As will be discussed below, features can be chosen based on a particular element to be extracted. For example, features indicative of a title will be different than features indicative of an author, a date of creation, etc.

Once the potential features are identified, the best features are selected at step 203. For example, the potential features that occur most often in the training documents can be selected. A model can be developed to express the best features at step 204 using sequences of labeled units. Labeled units (for example labeled as title_begin, title_end, or other) in the sequences are used as training data and models are developed for identifying whether a unit is title_begin, title_end or other.

Many types of models for extraction can be employed such as: Perceptron, Maximum Entropy (ME), Perceptron Markov Model (PMM), and Maximum Entropy Markov Model (MEMM). These models can be considered in the same metadata extraction framework. Each input to train the model is a sequence of units $x_1 x_2 \ldots x_k$ together with a sequence of labels $y_1 y_2 \ldots y_k$. In this case, $x_i$ and $y_i$ represent a unit and its label, respectively (i=1,2, . . . , k). A label represents title_begin, title_end, or other. Here, k is the number of units in a document.

In learning, a model is trained which can be generally denoted as a conditional probability distribution $P(Y_1 \ldots Y_k | X_1 \ldots X_k)$ where $X_i$ and $Y_i$ denote random variables taking instance $x_i$ and label $y_i$ as values, respectively (i=1,2, . . . , k). Assumptions can be made about the model. For example, one assumption can be that $Y_1, \ldots, Y_k$ are independent of each other given $X_1, \ldots, X_k$. Thus, the model can be expressed as:

$$P(Y_1 \ldots Y_k | X_1 \ldots X_k) = P(Y_1 | X_1) \ldots P(Y_k | X_k)$$

In this way, the model is decomposed into a number of classifiers. The classifiers can be trained locally (for example within a unit) using the labeled data. In one embodiment, a Perceptron or Maximum Entropy (ME) model is employed as the classifier. Another assumption that can be made is that a label depends on its previous label and thus the first order Markov property holds for $Y_1, \ldots, Y_k$ given $X_1, \ldots, X_k$. Thus, the model can be expressed as:

$$P(Y_1 \ldots Y_k | X_1 \ldots X_k) = P(Y_1 | X_1) \ldots P(Y_k | Y_{k-1} X_k)$$

Again, a number of classifiers are obtained. However, the classifiers are conditioned on the previous label. If a Perceptron or Maximum Entropy model is employed as a classifier, the models become a Perceptron Markov Model and Maximum Entropy Markov Model, respectively. In any case, one or more of the models developed is used during extraction.

Figure 3:
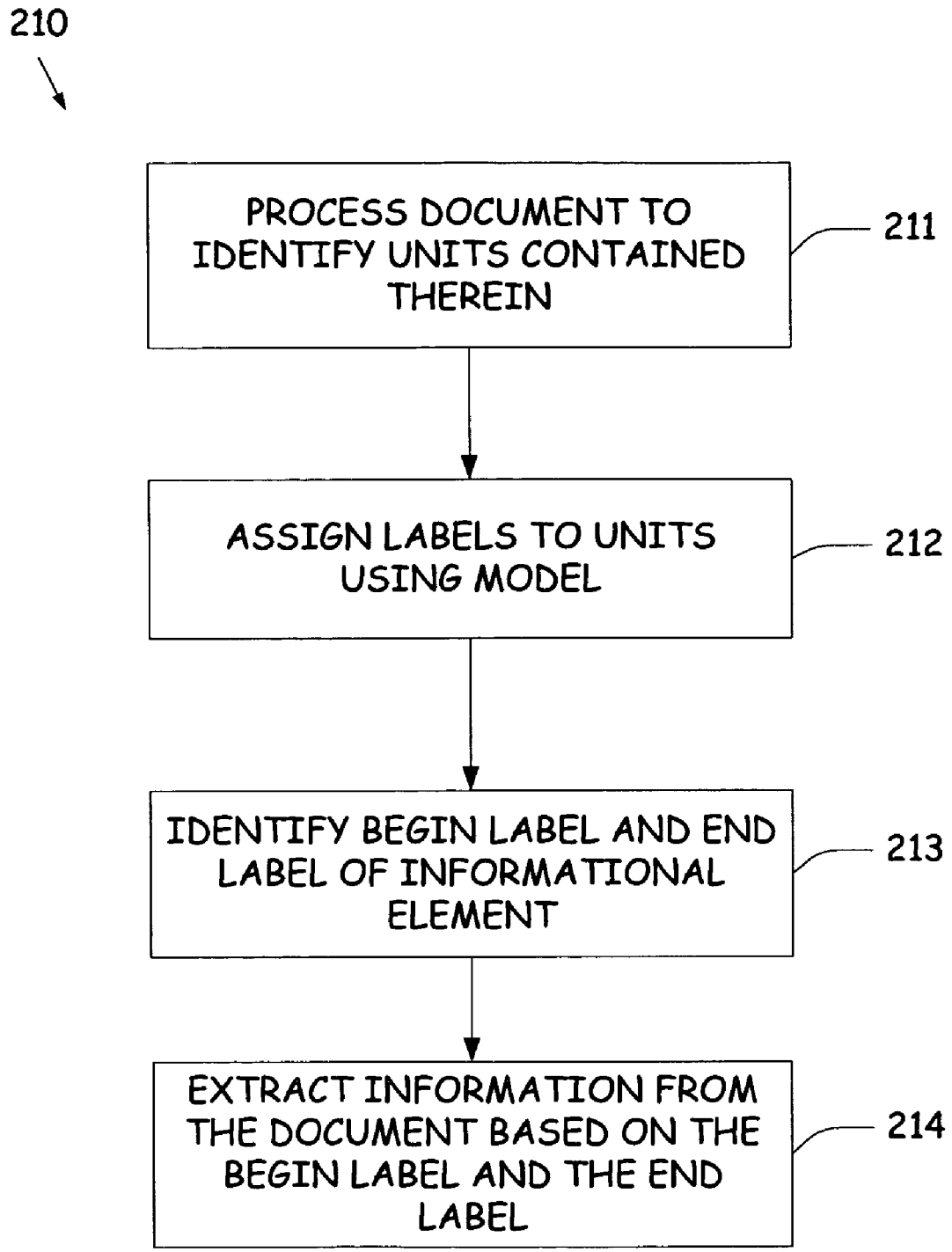
FIG. 3 is a flow chart of an exemplary method for extracting information from a document.

FIG. 3 illustrates an exemplary method 210 for extracting information from documents and/or portions thereof. A document is processed to identify units contained therein at step 211. The units identified are similar to those identified in step 201 of FIG. 2. In extraction, given a sequence of units, one or more of the models developed by method 200 is used to assign a sequence of labels to the sequence of units at step 212. A most likely begin label and a most likely end label of an informational element are identified at step 213. Information between the most likely begin label and most likely end label is extracted at step 214.

For Perceptron and ME models, labels can be assigned locally. Results can then be combined globally later using heuristics. For example, in extraction of a title, a most likely title begin label is identified. Then, a most likely title end label is identified within three units after the title begin label. Units between the title begin label and the title end label are extracted as the title. For PMM and MEMM, a Viterbi algorithm is employed to find a globally optimal label sequence.

Several variations of the models discussed above can be used for training and extraction. For example, one model is called Perceptron with uneven Margin. This version of Perceptron can work well when a number of positive instances and a number of negative instances differ greatly. Another variation is a version of a Perceptron Markov Model in which the Perceptron model is the so-called Voted Perceptron. In training, the parameters of the model are updated globally rather than locally.

Figure 4:
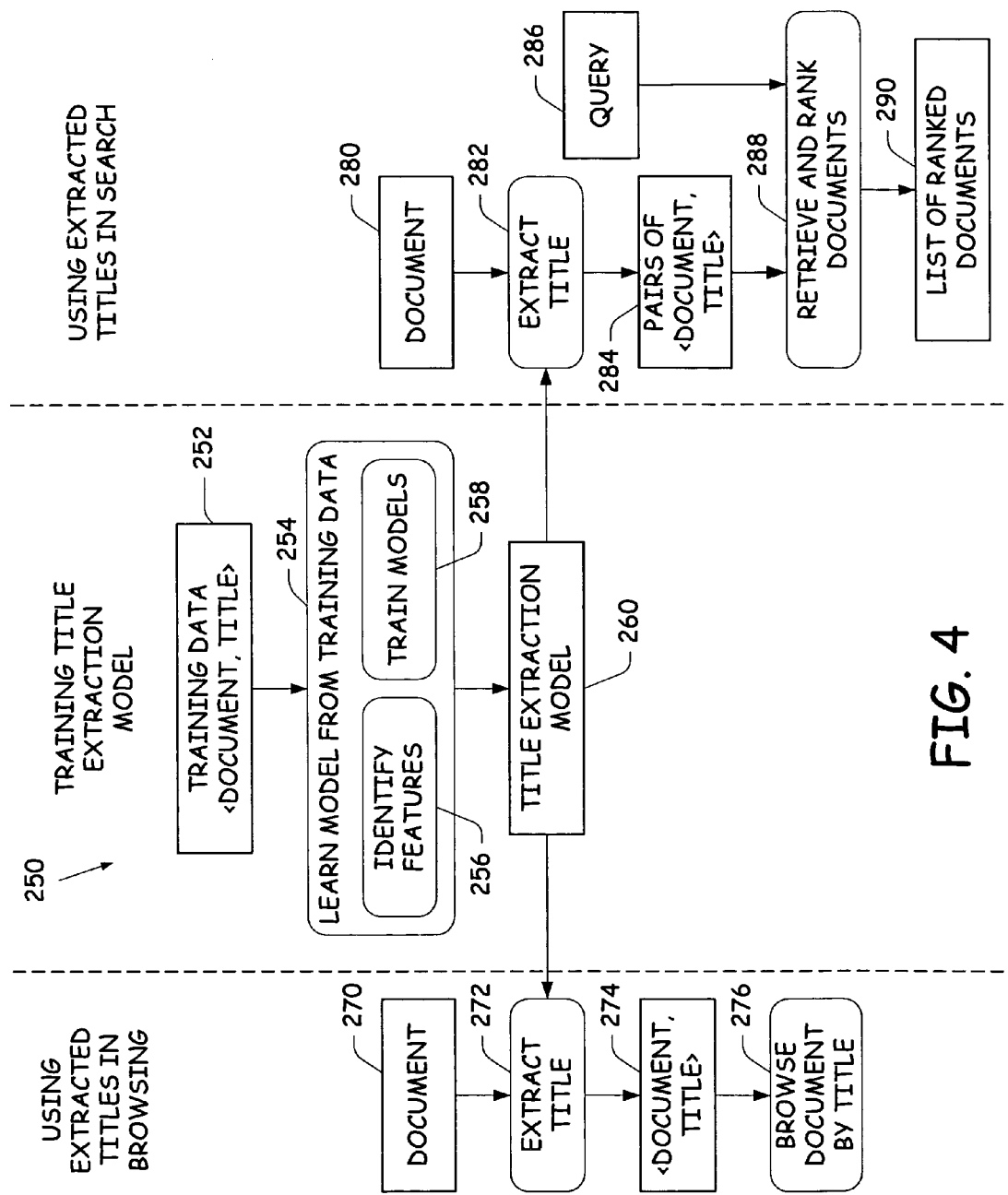
FIG. 4 is a block diagram of a document processing system.

FIG. 4 is a block diagram of a system 250 for extracting titles from documents and using extracted titles in browsing and search. The system 250 can also be used for extracting other types of information from documents. For example, system 250 can be used to extract types of metadata such as author, date of modification, etc.

Training documents 252 containing labeled titles are provided to a learning process 254. Learning process 254 include two processes, a feature identification process 256 and a model training process 258. Model training process 258 uses features identified by feature identification process 256 to train a title extraction model 260. Several possible features are discussed below.

For browsing, one or more documents 270 are provided to a title extraction process 272. Title extraction process 272 utilizes title extraction model 260. Extraction process 272 extracts a title from a document and creates a <document, title> pair 274. A browsing process 276 is used to browse the one or more documents 270 by title. In one example, browsing process 276 can be a desktop setting with file listings. The file listings can show the extracted title to aid a user in finding a desired document.

In search, an extracted title can be used in ranking documents. One or more documents 280 are provided to a title extraction process 282. Title extraction process 282 extracts a title from the documents and creates a <document, title> pair 284. A query 286 is provided to a retrieving and ranking process 288. Retrieving and ranking process 288 retrieves document pairs 284 and utilizes the pairs to rank relevant results as a function of query 286. A list of ranked documents 290 is then provided.

Document retrieval using extracted titles can aid in providing relevant search results for query 286. In information retrieval, a document is split into a number of fields including body, title, and anchor text. Other fields can include a universal resource locator (URL) and parameters independent of the query, for example documents length. A ranking function in search can use different weights for different fields of the document. Titles can be assigned high weights, indicating that they are important for document retrieval. Since authors do not completely or correctly express metadata information for documents, a significant number of documents actually have incorrect titles in the metadata. Thus, in addition to using the metadata, extracted titles can be used as one more field of the document. By doing this, overall precision of search results can be improved.

A search ranking algorithm can be employed that allows field weighting to retrieve documents in the index. One such algorithm is referred to as BM25, which is referred to in an article authored by S. Robertson, H. Zaragoza and M. Taylor tilted "Simple BM25 extension to multiple weighted fields", *In Proceedings of the Seventeenth International Conference on Computational Linguistics*, pp. 1079-1085, 1998. In a BM25 algorithm, documents are contained in an index. Body, title, extracted title and anchor are used as fields. The body and title of a document can be identified by meta data elements in the document or otherwise. The anchor includes text associated with a link in a source document.

To develop a scoring algorithm, several parameters can be defined. First, for each term (t) in the query 286, the term frequency (tf) is counted in each field (f) of the document. Each term frequency (tf) is then weighted according to a corresponding weight parameter (w) that can be express as:

$$wtf_t = \sum_f w_f tf_{tf}$$

Similarly, a document length (dl) can be computed as a weighted sum of lengths of each field, which can be expressed as:

$$wdl = \sum_f w_f dl_f$$

Average document length (avwdl) in the documents index becomes the average of all weighted document lengths. A best match algorithm known as BM25F can be modified and expressed as:

$$BM25F = \sum_t \frac{wtf_t(k_1 + 1)}{k_1\left((1-b) + b\frac{wdl}{avwdl}\right) + wtf_t} \times \log\left(\frac{N}{n}\right)$$

In this algorithm, b and $k_1$, are constants that can control an effect from tf being non-linear and normalize document lengths, respectively. N is the number of documents in the index and n is the number of documents having term t. In one example, $k_1$=1.8 and b=0.75. Additionally, a weight for body is 1.0, title is 10.0, anchor is 10.0 and extracted title is 5.0.

A similar ranking approach can be used for an HTML document. Given an HTML document, information is extracted from and stored in several fields including body, title, and extracted title. The extracted title field contains the title extracted by the method described above with regard to FIG. 3. An additional field can also be created in which the extracted title field and the title field is combined, and can be denoted as 'CombTitle'. Different methods for document retrieval with different uses of the fields are discussed below.

BasicField

In this method, a document is represented by all the texts in the title and body. Given a query, a BM25 algorithm is employed to calculate a score(s) of each document with respect to the query, which can be expressed as:

$$S = \sum_i \frac{(k_1 + 1)tf_i}{k_1\left((1-b) + b\frac{dl}{avdl}\right) + tf_i} \log\frac{N - df_i + 0.5}{df_i + 0.5}$$

Here, N is a number of documents in the index; i denotes a word in the query q; $tf_i$ and $df_i$ are term frequency and document frequency of i, respectively; dl is document length, and avdl is average document length; k, and b are parameters. In one example, $k_1$=1.1 and b=0.7.

BasicField+CombTitle

BM25 scores of the combined field (CombTitle) can be calculated with $k_1$=0.4 and b=0.95. The BM25 score of BasicField is also calculated. A normalization is conducted on both the BM25 score of the combined field and that of the BasicField. The score (S') of the combined field can be expressed as:

$$S' = \frac{\left(\sum_{ieq} \frac{(k_1 + 1)tf_i}{k_1\left((1-b) + b\frac{dl}{avdl}\right) + tf_i} \log\frac{N - df_i + 0.5}{df_i + 0.5}\right)}{\left(\sum_{ieq} (k_1 + 1)\log\frac{N - df_i + 0.5}{df_i + 0.5}\right)}$$

The two scores are linearly combined (S BasicFields and S' CombTitle):

αS'BasicField+(1−α)S'ComTitle

Here α is a coefficient ranging from 0 to 1.

BasicField+ExtTitle

A similar method to that of BasicField+CombTitle can be employed, in which instead of using the combined title filed, the extracted title field is used.

BasicField+Title

This is a similar method to BasicField+CombTitle, in which instead of using the combined title filed, the title field can be used.

As presented above, there are many types of features that can be used to train an extraction model. Example types include format features and linguistic features. The specific features below relate to title extraction, author extraction and last date of modification extraction. The features are used for identifying both begin and end labels.

Format Features for Titles

Font Size: There can be four are four binary features that represent the normalized font size of the unit (recall that a unit has only one type of font).

If the font size of the unit is the largest in the document, then the first feature will be 1, otherwise 0. If the font size is the smallest in the document, then the fourth feature will be 1, otherwise 0. If the font size is above the average font size and not the largest in the document, then the second feature will be 1, otherwise 0. If the font size is below the average font size and not the smallest, the third feature will be 1, otherwise 0. Normalization on font sizes can also be conducted. For example, in one document the largest font size might be '12pt', while in another the smallest one might be '18pt'.

Boldface: This binary feature represents whether or not the current unit is in boldface.

Alignment: There are four binary features that respectively represent the location of the current unit: 'left', 'center', 'right', and 'unknown alignment'.

The following format features with respect to 'context' play an important role in title extraction.

Empty Neighboring Unit: There are two binary features that represent, respectively, whether or not the previous unit and the current unit are blank lines.

Font Size Change: There are two binary features that represent, respectively, whether or not the font size of the previous unit and the font size of the next unit differ from that of the current unit.

Alignment Change: There are two binary features that represent, respectively, whether or not the alignment of the previous unit and the alignment of the next unit differ from that of the current one.

Same Paragraph: There are two binary features that represent, respectively, whether or not the previous unit and the next unit are in the same paragraph as the current unit.

Linguistic Features for Titles

The linguistic features are based on key words.

Positive Word: This binary feature represents whether or not the current unit begins with one of the positive words. The positive words include 'title:', 'subject:', 'subject line:' For example, in some documents the lines of titles and authors have the same formats. However, if lines begin with one of the positive words, then it is likely that they are title lines.

Negative Word: This binary feature represents whether or not the current unit begins with one of the negative words. The negative words include 'To', 'By', 'created by', 'updated by', etc. There are more negative words than positive words.

Word Count: Four intervals are created heuristically: [1, 2], [3, 6], [7, 9] and [9, ) and define one feature for each interval. If the number of words in a title falls into an interval, then the corresponding feature will be 1; otherwise 0.

Ending Character: This feature represents whether the unit ends with ':', '-', or other special characters. A title usually does not end with such a character.

For HTML documents, additional features can be used. Title extraction can be based on format information. Use of the following information can be considered in the selection of features for HTML documents.

Rich Format Information
a) Font size: 1~7 levels
b) Font weight: bold face or not
c) Font family: Times New Roman, Arial, etc
d) Font style: normal or italic
e) Font color: #000000, #FF0000, etc
f) Background color: #FFFFFF, #FF0000, etc
g) Alignment: center, left, right, and justify.

Tag Information
a) H1,H2, . . . ,H6: levels as header
b) LI: a listed item
c) DIR: a directory list
d) A: a link or anchor
e) U: an underline
f) BR: a line break
g) HR: a horizontal ruler
h) IMG: an image
i) Class name: 'sectionheader', 'title', 'titling', 'header', etc.

Position Information
a) Position from the beginning of body
b) Width of unit in page Document Object Model (DOM) Tree Information
a) Number of sibling nodes in the DOM tree.
b) Relations with the root node, parent node and sibling nodes in terms of font size change, etc.
c) Relations with the previous leaf node and next leaf node, in terms of font size change, etc. Note that the nodes might not be siblings.

Linguistic Information
a) Length of text: number of characters
b) Length of real text: number of alphabet letters c) Negative words: 'by', 'date', 'phone', 'fax', 'email', 'author', etc.
d) Positive words: 'abstract', 'introduction', 'summary', 'overview', 'subject', 'title', etc.

With the information above, four types of features can be created which can help identify the position (Pos), appearance (App), neighbor (Nei), and content (Con) of a title as shown below.

TABLE 1

Examples of features

| Type | Feature descriptions |
|---|---|
| Pos | Unit in top 0.2, top 0.4, or rest of page |
| Pos | Unit width <0.1, 0.2, 0.3, or 0.4 of page Width |
| Pos | First unit in DOM tree |
| App | Is unit tagged with H1, . . . , H6, or no H* tag |
| App | Is first, second, or third H* tagged unit |
| App | Is top or second level H* tagged unit in DOM tree |
| App | Is only H* tagged unit in DOM tree |
| App | Largest, or second largest font size |
| App | Percentage of unit font size <0.02, 0.02~0.10, etc |
| App | Alignment of unit is center, left, right, or justify |
| App | Is unit in bold face |
| App | Unit is italic |
| App | Unit is underlined |
| App | Percentage of units in same color is <0.05, 0.05~0.21, etc |
| App | Percentage of units in same background color is <0.05, 0.05~0.21, etc |
| App | Percentage of units in same font family is <0.05, 0.05~0.21, etc |
| App | In bullet (i.e., tagged with LI) |
| App | Begin with new line |
| Con | All characters, or first characters capitalized |
| Con | Number of characters is <8, 8-64, 64-96, >96 |
| Con | Begins with "subject:", "introduction", "title", "overview", etc |
| Nei | Previous or next unit is tagged as HR, BR, etc |
| Nei | Font size is larger than root, node, previous leaf, next leaf, or brother node |
| Nei | Alignment of previous node is left and current is center, etc |
| Nei | If the same level units have same font size, font weight, etc |

Other exemplary features can slow be used as shown below. Author Features that can be used are shown below.

| Category | Feature |
|---|---|
| Smart tag | If there are personal names recognized by smart tag in the unit, this feature will be 1. |
| Name list | If there are personal names can be recognized by the help of name list in the unit, this feature will be 1. |
| Uppercase | If the first letter of each word is not capitalized, this feature will be 1. |
| Positive words | When the text of current unit begins with some words, such as "author:" and "owner:", it will be 1. When the text of current unit begins with some words, such as "speaker:" and "present by", it will be 1. When the text of current unit contains some words, such as "author:" and "owner:", it will be 1. |
| Negative words | When the unit begins with some words, such as "To:" and "Copy to:", it will be |

| Category | Feature |
| --- | --- |
| | 1. When the text of current unit begins with some words, such as "subject:" and "title:", it will be 1. When the text of current unit contains some words, such as "January", it will be 1. |
| Character count | If the number of characters in the unit is larger than 64 and is smaller than 128, this feature will be 1. If the number of characters in the unit is larger than 128, this feature will be 1. |
| Average word count | Average word number separated by comma. For example, if the unit is "Hang Li, Min Zhou", the average word number of this unit will be (2 + 2)/2 = 2. If the value is between 2 and 3, this feature will be 1. If the count is larger than 3, this feature will be 1. |
| Period mark | Personal names can contain ".", e.g. "A. J. Mohr" and "John A. C. Kelly". If the unit contains the pattern: capital + "." + blank, the feature of this category will be 1. |
| End with Mark | If the text of current unit ends with ";", ":" or ",", and current unit didn't begin with positive or negative words, this feature will be 1. |

Title Features

| Category | Feature |
| --- | --- |
| Font size | The font size of the unit is the largest among all the units. If all units have the same font size, they will all have this feature as being 1. The font size of the unit is the second largest. The font size of the unit is the third largest. The font size of the unit is the fourth largest. The font size of the unit is the smallest. |
| Word number | If the unit contains 1 words, this feature will be 1; otherwise it will be 0. If the unit contains 2 to 4 words, this feature will be 1; otherwise it will be 0. If the unit contains 5 to 9 words, this feature will be 1; otherwise it will be 0. If the unit contains 10 to 15 words, this feature will be 1; otherwise it will be 0. If the unit contains more than 15 words, this feature will be 1; otherwise it will be 0. |
| Bold face | Unit has bold face. |
| Alignment | Unit's alignment is center. |
| Positive words | When the unit begins with these words, it will be 1. |
| Negative words | When this unit contains nothing other than these words, it will be 1. For example, if the unit begin with "To" or "By", it will be 1. When unit begins with these words, it will be 1. When the unit contains these words, it will be 1. |
| Single unit | If the region for extraction only contains this unit, this feature will be 1. |
| Paragraph number change | In the model for title beginning, if the previous unit has different paragraph number (from Office Automation), this feature will be 1. In the model for title end, if the next unit has different paragraph number, then this feature will be 1. |
| End with Mark | If the current unit ends with ";", ":" or "," this feature will be 1. |
| Previous unit is space | If previous unit is an empty unit, this feature will be 1. |
| Font size changed | If font size of current unit is bigger than previous one, this feature will be 1. If font size of current unit is smaller than previous one, this feature will be 1. If font size of current unit is equal with previous one, this feature will be 1. |
| Bold face changed | If current unit has bold face but precious unit has no bold face, this feature will be 1. If current unit has not bold face but precious unit has bold face, this feature will be 1 If current unit and precious unit have bold face or not at the same time, this feature will be 1 |
| Alignment changed | If alignment of current unit is center and previous one is not, this feature will be 1. If alignment of current unit is not center and previous one is, this feature will be 1. If alignment of current unit is the same with previous one, this feature will be 1. |
| # Words in previous unit/ # Words count in current unit (Rate) | If the rate is equal or bigger than 6.31 Else if the rate is equal or bigger than 3.98 Else if the rate is equal or bigger than 2.51 Else if the rate is equal or bigger than 1.58 Else if the rate is equal or bigger than 1 Else if the rate is equal or bigger than 0.63 Else if the rate is equal or bigger than 0.40 Else if the rate is equal or bigger than 0.25 Else if the rate is equal or bigger than 0.16 Otherwise this feature will be 1. |

A feature list used by a time predictor is shown below. t denotes the time expression, and u denote the unit where t locates. Here a unit can be a paragraph, a row in a table, a header or footer.

| Feature ID | Description |
| --- | --- |
| 1.1 | u is extracted from "Body" (include paragraphs and tables) |
| 1.2 | u is extracted from "Header" |
| 1.3 | u is extracted from "Footer" |
| 1.4 | u is extracted from "Table" |
| 2.1 | the text length of unit u is less than 20 |
| 2.2 | the text length of unit u is less than 30 |
| 2.3 | the text length of unit u is less than 40 |
| 2.4 | the text length of unit u is larger than 100 |
| 3.1 | offset of text of t in the text of u is 0 |
| 3.2 | offset of text of t in the text of u is less than 5 |
| 3.3 | offset of text of t in the text of u is less than 15 |
| 3.4 | offset of text of t in the text of u is less than 30 |
| 3.5 | offset of text of t in the text of u is >=30 |
| 4.1 | the reverse offset of text of t in the text of u is 0 |
| 4.2 | the reverse offset of text of t in the text of u is less than 5 |
| 4.3 | the reverse offset of text of t in the text of u is less than 15 |
| 4.4 | the reverse offset of text of t in the text of u is less than 30 |
| 4.5 | the reverse offset of text of t in the text of u is >=30 |
| 5.1 | all the text of u is just the text of t |
| 6.1 | number of previous empty paragraph is 0 |
| 6.2 | number of previous empty paragraph is 1 |
| 6.3 | number of previous empty paragraph is 2 |
| 6.4 | number of previous empty paragraph is 4 |
| 6.5 | number of previous empty paragraph is >=5 |
| 7.1 | number of next empty paragraph is 0 |
| 7.2 | number of next empty paragraph is 1 |
| 7.3 | number of next empty paragraph is 2 |
| 7.4 | number of next empty paragraph is 4 |
| 7.5 | number of next empty paragraph is >=5 |
| 8.1 | u is extracted from first table |
| 8.2 | u is extracted from second table |
| 8.3 | u is extracted from last table |
| 9.1 | u is extracted from first paragraph |
| 9.2 | u is extracted from 2nd~3rd paragraph |
| 9.3 | u is extracted from 4th~5th paragraph |
| 9.4 | u is extracted from last 2 paragraphs |
| 10.1 | u starts within the first 100 |
| 10.2 | u starts within the first 100~200 |
| 11.1 | u ends within the last 100 |
| 12.1 | the unit is not in bold |
| 12.2 | the unit is all in bold |
| 13.1 | Font size is <11 |
| 13.2 | Font size is 11~13 |
| 13.3 | Font size is >16 |
| 14.1 | Text alignment is "center" |
| 14.2 | Text alignment is "right" |
| 15.1 | u is in the first line of table |
| 15.2 | u is in the last line of table |
| 16.1 | Match with last print date in meta data, no more than 20 days spanned |
| 16.2 | Match with last save time in meta data, no more than 20 days spanned |
| 16.3 | Match with creation date in meta data, no more than 20 days spanned |
| 17.1 | The previous 20 bytes of text before t contains word "update", "updated", "reversion", "modify", "modified", "rev", "change", "changed", "revise", "revised" |
| 17.2 | The previous 20 bytes of text before t contains word "date", "published", "publish", "DA", "version", "ver", "copyright", "saved", "printed", "print" |
| 17.3 | the previous 20 bytes of text before t contain word "creation", "created" |
| 17.4 | the previous 20 bytes of text before t contain word "last", "latest" |

Automatically extracting information from documents can be utilized based on the subject matter described above. Extraction models can be developed based on different types of features. Information extract can be used in document processing situations including browsing, search and filtering.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of creating and utilizing a computer-based model, comprising:
   accessing a collection of training documents having labels indicative of an informational element contained therein;
   identifying format features of the informational element based on the labels;
   developing an information extraction model based on the format features;
   storing the information extraction model on a computer-readable storage medium; and
   utilizing the information extraction model as a basis for extracting a collection of data from a document, wherein utilizing as a basic comprises utilizing as a guide for locating the collection of data within the document.

2. The method of claim 1 and further comprising identifying units within each of the training documents, each unit having a similar format.

3. The method of claim 1 wherein the format features include at least one of a font, a position and a neighboring portion of the informational element.

4. The method of claim 1 wherein the informational element is one of a title of a document, an author of a document and a date associated with a document.

5. The method of claim 1 and further comprising identifying linguistic features of the informational element and developing the information extraction model based on the linguistic features.

6. The method of claim 1 wherein the model is one of a perceptron model, a maximum entropy model, a perceptron markov model and a maximum entropy markov model.

7. A computer-implemented method of extracting and utilizing a document, comprising:
   identifying units of similar format in the document;
   assigning labels to the units based on format features of the units;
   identifying a begin label and an end label of an informational element in the document from the labels;
   extracting information in the units between the begin label and the end label;

storing the extracted information on a computer-readable storage medium; and utilizing the extracted information as a basis for processing the document.

8. The method of claim 7 and further comprising identifying a plurality of begin labels and selecting a most likely begin label as the begin label.

9. The method of claim 7 and further comprising identifying a plurality of end labels and selecting a most likely end label as the end label based on the begin label.

10. The method of claim 7 wherein the format features include at least one of a font of the units, a position of the units and a neighboring portion of the units.

11. The method of claim 7 wherein the information extracted is at least one of a title of the document, an author of the document and a date associated with the document.

12. The method of claim 7 wherein assigning labels to the units is further based on linguistic features of the units.

13. A computer-implemented method for processing a plurality of documents containing text, comprising:

identifying parameters related to ranking the plurality of documents;

extracting fields of text associated with each of the plurality of documents;

associating the extracted fields of text with the identified parameters; and ranking the plurality of documents using the identified parameters and the extracted fields of text associated with the identified parameters.

14. The method of claim 13 and further comprising:

receiving a query;

assigning a score to each of the plurality of documents based on the identified parameters, including at least one of the parameters associated with an extracted field; and ranking each of the plurality of documents based on the score.

15. The method of claim 14 wherein the extracted fields of text include at least one of a title and an author of each of the plurality of documents.

16. The method of claim 15 wherein the fields of text associated with the identified parameters include a body, a title, an extracted title, anchor, text, a universal resource locator and query independent parameters associated with each of the plurality of documents, and wherein the score is further assigned based on comparing the query to the body, the title, the extracted title, the anchor text, the universal resource locator and query independent parameters.

17. The method of claim 16 wherein the score is assigned using a BM25 algorithm that utilizes the identified parameters.

18. The method of claim 13 and further comprising combining at least two extracted fields of text and ranking the plurality of documents based on the combination.

19. method of claim 13 and further comprising processing text in the document to identify units of similar format contained therein and wherein text is extracted from the units based on format features that include at least one of a font of a unit, a position of a unit and a neighboring unit.

* * * * *

UNITED STATES PATENT AND TRADEMARK OFFICE
CERTIFICATE OF CORRECTION

| | | |
|---|---|---|
| PATENT NO. | : 7,469,251 B2 | Page 1 of 1 |
| APPLICATION NO. | : 11/192687 | |
| DATED | : December 23, 2008 | |
| INVENTOR(S) | : Hang Li et al. | |

It is certified that error appears in the above-identified patent and that said Letters Patent is hereby corrected as shown below:

In column 16, line 28, in Claim 19, after "19." insert -- The --.

Signed and Sealed this

Twenty-sixth Day of April, 2011

David J. Kappos
*Director of the United States Patent and Trademark Office*